(12) United States Patent
Tanaka et al.

(10) Patent No.: US 9,789,437 B2
(45) Date of Patent: Oct. 17, 2017

(54) CO2 RECOVERY DEVICE AND CO2 RECOVERY METHOD

(71) Applicant: MITSUBISHI HEAVY INDUSTRIES, LTD., Tokyo (JP)

(72) Inventors: Hiroshi Tanaka, Tokyo (JP); Hiromitsu Nagayasu, Tokyo (JP); Takuya Hirata, Tokyo (JP); Tsuyoshi Oishi, Tokyo (JP); Takashi Kamijo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 201 days.

(21) Appl. No.: 14/411,330

(22) PCT Filed: Apr. 17, 2013

(86) PCT No.: PCT/JP2013/061403
§ 371 (c)(1),
(2) Date: Dec. 24, 2014

(87) PCT Pub. No.: WO2014/030388
PCT Pub. Date: Feb. 27, 2014

(65) Prior Publication Data
US 2015/0139878 A1   May 21, 2015

(30) Foreign Application Priority Data
Aug. 20, 2012   (JP) .................. 2012-181442

(51) Int. Cl.
*B01D 53/78* (2006.01)
*B01D 53/50* (2006.01)
(Continued)

(52) U.S. Cl.
CPC ......... *B01D 53/62* (2013.01); *B01D 53/1475* (2013.01); *B01D 53/18* (2013.01);
(Continued)

(58) Field of Classification Search
None
See application file for complete search history.

(56) References Cited

U.S. PATENT DOCUMENTS

| | | |
|---|---|---|
| 2008/0286189 A1 | 11/2008 | Find et al. |
| 2011/0135550 A1 | 6/2011 | Nagayasu et al. |
| 2011/0308389 A1 | 12/2011 | Graff et al. |

FOREIGN PATENT DOCUMENTS

| | | |
|---|---|---|
| AU | 2012220717 B2 | 7/2015 |
| EP | 2 335 802 A2 | 6/2011 |

(Continued)

OTHER PUBLICATIONS

Office Action dated Aug. 28, 2015 issued in counterpart Australian application No. 2013307050 (3 pages).
(Continued)

*Primary Examiner* — Daniel Berns
(74) *Attorney, Agent, or Firm* — Westerman, Hattori, Daniels & Adrian, LLP

(57) ABSTRACT

A $CO_2$ recovery device is provided with a $CO_2$ absorption tower and an absorption-solution regeneration tower. The $CO_2$ absorption tower includes: a $CO_2$ absorption section in which $CO_2$-containing flue gas is brought into contact with a $CO_2$ absorption solution, namely a basic-amine-compound absorption solution, so as to remove $CO_2$ from the $CO_2$-containing flue gas; and a water-washing section in which decarbonated flue gas from which $CO_2$ has been removed is brought into contact with washing water so as to remove accompanying substances accompanying the decarbonated flue gas. The absorption-solution regeneration tower regenerates the $CO_2$ absorption solution that has absorbed $CO_2$. This $CO_2$ recovery device, in which a lean solution from which $CO_2$ has been removed is reused in the $CO_2$ absorption tower, has an aldehyde-removing agent supply unit that supplies a sulfite-compound aldehyde removing agent to a
(Continued)

circulating washing-water line that circulates the washing water to the water-washing section.

2 Claims, 10 Drawing Sheets

(51) Int. Cl.
    *B01D 53/56*     (2006.01)
    *B01D 53/62*     (2006.01)
    *B01D 53/75*     (2006.01)
    *B01D 53/77*     (2006.01)
    *B01D 53/96*     (2006.01)
    *B01D 53/14*     (2006.01)
    *C01B 31/20*     (2006.01)
    *B01D 53/18*     (2006.01)

(52) U.S. Cl.
    CPC ............. *B01D 53/75* (2013.01); *B01D 53/77* (2013.01); *B01D 53/78* (2013.01); *B01D 53/96* (2013.01); *C01B 31/20* (2013.01); *B01D 2251/304* (2013.01); *B01D 2251/60* (2013.01); *B01D 2252/103* (2013.01); *B01D 2252/20478* (2013.01); *B01D 2257/504* (2013.01); *B01D 2257/704* (2013.01); *Y02C 10/04* (2013.01); *Y02C 10/06* (2013.01); *Y02P 20/152* (2015.11)

(56) References Cited

FOREIGN PATENT DOCUMENTS

| EP | 2 405 989 | | 1/2012 |
|---|---|---|---|
| EP | 2678093 | A1 | 1/2014 |
| FR | 2 958 180 | A1 | 10/2011 |
| JP | 48-73371 | A | 10/1973 |
| JP | 2002-126439 | A | 5/2002 |
| JP | 2005-40683 | A | 2/2005 |
| JP | 2007-152171 | A | 6/2007 |
| JP | 2007-284272 | A | 11/2007 |
| JP | 2009-501691 | A | 1/2009 |
| JP | 2011-115724 | A | 6/2011 |
| JP | 2012-520167 | A | 9/2012 |
| WO | 2009/138363 | A1 | 11/2009 |
| WO | 2010/102877 | A1 | 9/2010 |
| WO | 2012/115992 | A1 | 8/2012 |

OTHER PUBLICATIONS

International Search Report dated Jul. 16, 2013 issued in corresponding application No. PCT/JP2013/061403.
Written Opinion of the International Searching Authority dated Jul. 16, 2013 issued in corresponding application No. PCT/JP2013/061403.
English Translation of Written Opinion of the International Searching Authority dated Jul. 16, 2013 issued in corresponding Application No. PCT/JP2013/061403. (3 pages).
Decision of a Patent Grant dated Jun. 7, 2016, issued in counterpart Japanese Patent Application No. 2012-181442, with English translation. (4 pages).
Notice of Allowance dated Jun. 14, 2016, issued in counterpart Canadian Patent Application No. 2,878,910. (1 page).
Notice of Acceptance dated Nov. 12, 2015 issued in counterpart Australian patent application No. 2013307050. (2 pages).
Extended European Search Report dated Jul. 29, 2015, issued in counterpart European Patent Application No. 13831157.6 (8 pages).
Office Action dated Jan. 5, 2016, issued in counterpart Japanese Patent Application No. 2012-181442, with English translation. (12 pages).

FIG. 7A

| | AMINE COMPOUND | |
|---|---|---|
| | METHOD OF RELATED ART | EMBODIMENT 2 |
| RECOVERY RATIO (%) OF ACCOMPANYING SUBSTANCES IN OUTLET GAS OF ABSORPTION TOWER | ~96 (range 90–100) | ~97 (range 90–100) |
| SULFITE/BISULFITE COMPOUND (RATIO TO STANDARD ADDITION AMOUNT) | NOT ADDED | ADDED |
| ACID (pH) | NOT ADDED (ALKALINE/NOT CONTROLLED) | ADDED (ACIDIC/STANDARD pH) |
| NUMBER OF STAGES OF WATER-WASHING SECTIONS | 1 | |

FIG. 7B

| | ALDEHYDE COMPOUND | |
|---|---|---|
| | METHOD OF RELATED ART | EMBODIMENT 2 |
| RECOVERY RATIO (%) OF ACCOMPANYING SUBSTANCES IN OUTLET GAS OF ABSORPTION TOWER | ~3 (range 0–100) | ~95 (range 0–100) |
| SULFITE/BISULFITE COMPOUND (RATIO TO STANDARD ADDITION AMOUNT) | NOT ADDED | ADDED (1) |
| ACID (pH) | NOT ADDED (ALKALINE/NOT CONTROLLED) | ADDED (ACIDIC/STANDARD pH) |
| NUMBER OF STAGES OF WATER-WASHING SECTIONS | 1 | |

FIG. 9A

| | AMINE COMPOUND | |
|---|---|---|
| | METHOD OF RELATED ART | EMBODIMENT 3 |
| RECOVERY RATIO (%) OF ACCOMPANYING SUBSTANCES IN OUTLET GAS OF ABSORPTION TOWER | ~96 (90–100 scale) | ~100 |
| SULFITE/BISULFITE COMPOUND (RATIO TO STANDARD ADDITION AMOUNT) | NOT ADDED | ADDED |
| ACID (pH) | NOT ADDED (ALKALINE/NOT CONTROLLED) | ADDED (ACIDIC/STANDARD pH) |
| NUMBER OF STAGES OF WATER-WASHING SECTIONS | 1 | 2 (4 LAYERS) |

FIG. 9B

| | ALDEHYDE COMPOUND | |
|---|---|---|
| | METHOD OF RELATED ART | EMBODIMENT 3 |
| RECOVERY RATIO (%) OF ACCOMPANYING SUBSTANCES IN OUTLET GAS OF ABSORPTION TOWER | ~0 (0–100 scale) | ~95 |
| SULFITE/BISULFITE COMPOUND (RATIO TO STANDARD ADDITION AMOUNT) | NOT ADDED | ADDED (0.75) |
| ACID (pH) | NOT ADDED (ALKALINE/NOT CONTROLLED) | ADDED (ACIDIC/STANDARD pH) |
| NUMBER OF STAGES OF WATER-WASHING SECTIONS | 1 | 2 (4 LAYERS) |

US 9,789,437 B2

CO2 RECOVERY DEVICE AND CO2 RECOVERY METHOD

TECHNICAL FIELD

The present invention relates to a $CO_2$ recovery device and a $CO_2$ recovery method, in which the concentrations of a basic amine compound and an aldehyde compound can be simultaneously reduced, the basic amine compound and the aldehyde compound remaining in and being emitted from decarbonated flue gas from which $CO_2$ has been removed by being brought into contact with an absorption solution.

BACKGROUND ART

As one of the causes of global warming, the greenhouse effect by $CO_2$ has been identified, and a countermeasure thereof is urgently required internationally from the viewpoint of protecting the global environment. Sources of $CO_2$ emission spread over various fields of human activity where fossil fuel is burned, and demand on emission reduction of $CO_2$ tends to increase. As a result, for power generation facilities such as a thermal power plant where a large amount of fossil fuel is used, a $CO_2$ recovery method has been actively studied in which flue gas of a boiler is brought into contact with an amine-based absorption solution such as an aqueous amine compound solution so as to remove and recover $CO_2$ from the flue gas.

When $CO_2$ is recovered from flue gas using such an absorption solution, decarbonated flue gas from which $CO_2$ has been recovered is accompanied by amine compounds. In order to prevent air pollution by the amine compound, it is necessary to reduce the amount of the amine compound emitted along with the decarbonated flue gas.

In the related art, PTL 1 discloses an amine recovery process in which the amine compound accompanying decarbonated flue gas, from which $CO_2$ has been absorbed and removed by gas-liquid contact with an absorption solution, is sequentially recovered in plural stages of water-washing sections that are provided for bringing the decarbonated flue gas into gas-liquid contact with washing water to recover the amine compound. As the washing water disclosed in PTL 1, condensate is used, the condensate being obtained by condensing and separating moisture contained in $CO_2$ in a treatment in which $CO_2$ is removed from the $CO_2$-absorbed amine-based absorption solution to regenerate the amine-based absorption solution.

In addition, in the related art, PTL 2 discloses a configuration in which the washing efficiency is further improved by providing plural stages of water-washing sections and washing the decarbonated flue gas with acidic water in an uppermost water-washing section among the plural stages of water-washing sections.

CITATION LIST

Patent Literature

[PTL 1] Japanese Unexamined Patent Application Publication No. 2002-126439
[PTL 2] Japanese Unexamined Patent Application Publication No. 2011-115724

SUMMARY OF INVENTION

Technical Problem

However, while being circulated around an absorption tower and a regeneration tower for reuse, the amine compound which is the absorption solution may contain the aldehyde compound which is produced by sequential oxidative degradation. The aldehyde compound is a volatile organic compound (VOC), and this volatile organic compound may be a large burden on the environment when emitted from the absorption tower to the outside of the system.

In the technique disclosed in PTL 2, accompanying substances accompanying the decarbonated flue gas are recovered in the water-washing sections, but there is a problem in that, with a well-known method such as water washing or pickling, the accompanying substances containing aldehyde cannot be sufficiently recovered until the concentration thereof is reduced to a low concentration level. Therefore, the improvement of recovery performance of the substances accompanying the decarbonated flue gas is desired.

Accordingly, it is desired to simultaneously reduce the concentrations of the amine compound and the aldehyde compound which are the absorption solution remaining in and accompanying the decarbonated flue gas.

In particular, when a $CO_2$ recovery device is installed to process flue gas in, for example, a thermal power plant where the estimated flow rate of gas to be processed in the future is high, the amount of accompanying substances remaining in and emitted from decarbonated flue gas will tend to increase due to a large amount of flue gas to be emitted. Therefore, it is necessary to further reduce the concentration of the accompanying substances to be emitted.

The present invention has been made in order to solve the above-described problems, and an object thereof is to provide a $CO_2$ recovery device and a $CO_2$ recovery method, in which the concentrations of basic amine compounds and aldehyde compounds can be simultaneously reduced, the basic amine compound and the aldehyde compound remaining in and being emitted from decarbonated flue gas from which $CO_2$ has been removed by being brought into contact with an absorption solution.

Solution to Problem

According to a first aspect of the present invention for solving the above-described problems, there is provided a $CO_2$ recovery device including a $CO_2$ absorption tower and an absorption-solution regeneration tower, wherein the $CO_2$ absorption tower includes: a $CO_2$ absorption section in which flue gas is brought into contact with a basic-amine-compound absorption solution so as for the basic-amine-compound absorption solution to absorb $CO_2$ in the flue gas; and a water-washing section in which decarbonated flue gas, from which $CO_2$ has been removed in the $CO_2$ absorption section, is brought into contact with washing water so as to remove accompanying substances accompanying the decarbonated flue gas, the absorption-solution regeneration tower separates $CO_2$ from the $CO_2$-absorbed rich solution to regenerate the basic-amine-compound absorption solution as a lean solution, the lean solution from which $CO_2$ has been removed in the absorption-solution regeneration tower is reused as the basic-amine-compound absorption solution in the $CO_2$ absorption tower, and the $CO_2$ recovery device further includes an aldehyde-removing agent supply unit that supplies an aldehyde-compound removing agent to a circulating washing-water line that circulates the washing water to the water-washing section.

According to a second aspect of the present invention, the $CO_2$ recovery device according to the first aspect may further include acid supply means for supplying an acid to the circulating washing-water line.

According to a third aspect of the present invention, in the $CO_2$ recovery device according to the first or second aspect, plural stages of water-washing sections may be provided, and the $CO_2$ recovery device may further include an aldehyde-removing agent supply unit that supplies the aldehyde-compound removing agent to the circulating washing-water line of a water-washing section close to a tower top portion of the $CO_2$ absorption tower.

According to a fourth aspect of the invention, the $CO_2$ recovery device according to any one of the first to third aspects may further include: gas cooling means for bringing flue gas containing $CO_2$, a nitrogen oxide, and a sulfur oxide into contact with alkali-added cooling water, the gas cooling means being provided on an upstream side of the $CO_2$ absorption tower; and a supply line that supplies, after the contact, the alkali-added cooling water to the circulating washing-water line.

According to a fifth aspect of the present invention, there is provided a $CO_2$ recovery method in which a $CO_2$ absorption tower and an absorption-solution regeneration tower are used to reuse a lean solution, from which $CO_2$ has been removed in the absorption-solution regeneration tower, in the $CO_2$ absorption tower, the $CO_2$ absorption tower bringing $CO_2$-containing flue gas into contact with a basic amine compound so as to remove $CO_2$, the absorption-solution regeneration tower separating $CO_2$ from the $CO_2$-absorbed basic amine compound to regenerate a $CO_2$ absorption solution, and the method including: simultaneously removing a basic amine compound and an aldehyde compound by supplying an aldehyde-compound removing agent to washing water while washing decarbonated flue gas with the washing water in a water-washing section.

According to a sixth aspect of the present invention, in the $CO_2$ recovery method according to the fifth aspect, an acid may be supplied to the washing water.

According to a seventh aspect of the present invention, in the $CO_2$ recovery method according to the fifth or sixth aspect, plural stages of water-washing sections may be provided, and the aldehyde-compound removing agent may be supplied to a water-washing section close to a tower top portion of the $CO_2$ absorption tower.

According to an eighth aspect of the present invention, in the $CO_2$ recovery method according to any one of the fifth to seventh aspects, on an upstream side of the $CO_2$ absorption tower, flue gas containing $CO_2$, a nitrogen oxide, and a sulfur oxide may be brought into contact with alkali-added cooling water to cool the flue gas, and after the contact, the alkali-added cooling water is used as circulating water of the water-washing section.

Advantageous Effects of Invention

According to the present invention, basic amine compounds and aldehyde compounds accompanying decarbonated flue gas can be simultaneously removed and recovered. Therefore, emission of the basic amine compound and the volatile organic compound from an absorption tower to the outside of the system is significantly suppressed.

BRIEF DESCRIPTION OF DRAWINGS

FIG. 7A is a diagram illustrating the results of a removal ratio (recovery ratio; %) of an amine compound in Test Example 2.

FIG. 7B is a diagram illustrating the results of a removal ratio (recovery ratio; %) of an aldehyde compound in Test Example 2.

FIG. 9A is a diagram illustrating the results of a removal ratio (recovery ratio; %) of an amine compound in Test Example 3.

FIG. 9B is a diagram illustrating the results of a removal ratio (recovery ratio; %) of an aldehyde compound in Test Example 3.

DESCRIPTION OF EMBODIMENTS

A preferred embodiment of the present invention will be described in detail with reference to the following accompanying drawings. The present invention is not limited to the embodiment. In addition, in the case of plural embodiments, combinations of the respective embodiments are included in the present invention.

Embodiment 1

Figure 1:
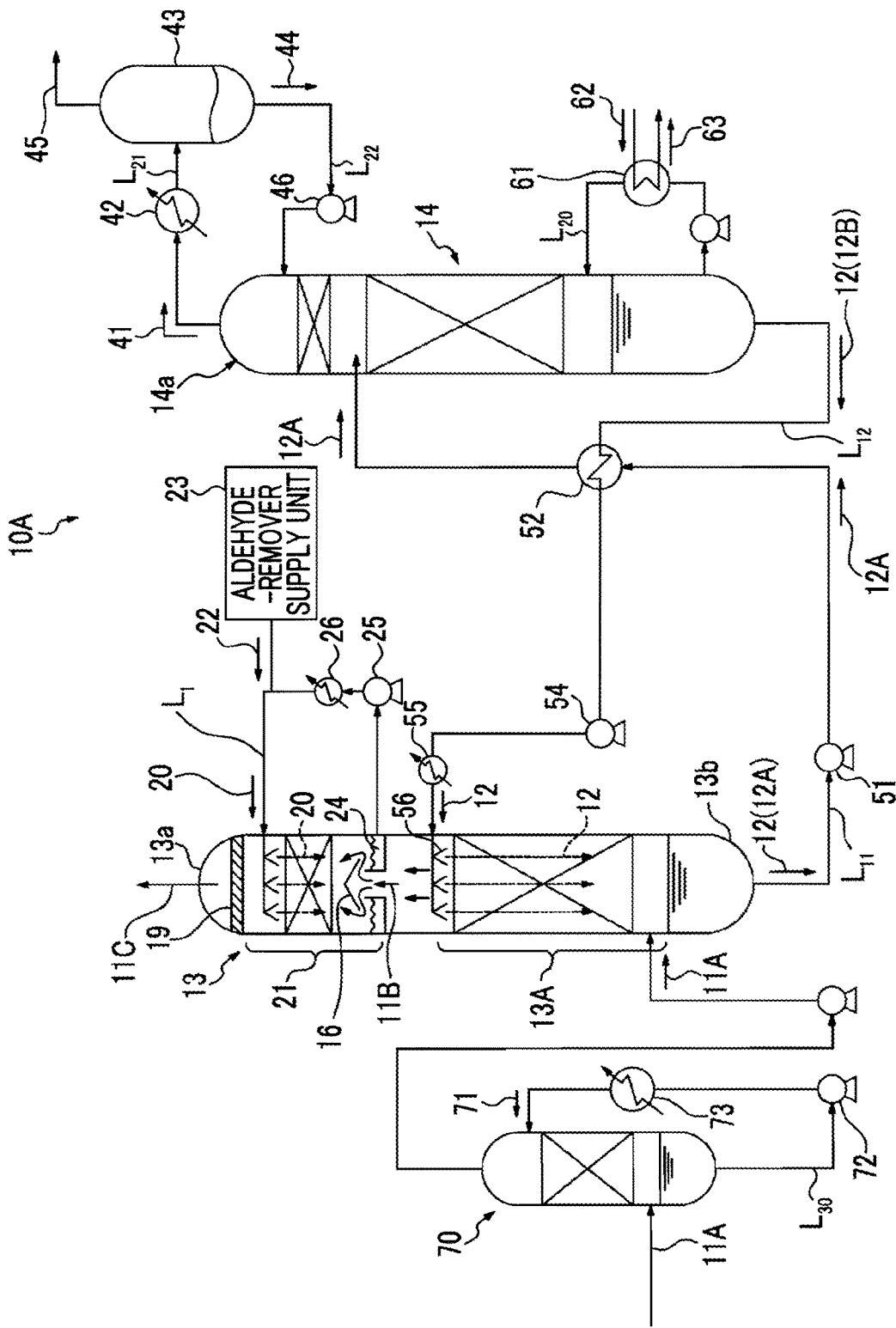
FIG. 1 is a schematic diagram illustrating a $CO_2$ recovery device according to Embodiment 1.

A $CO_2$ recovery device according to an embodiment of the present invention will be described with reference to the drawings. FIG. 1 is a schematic diagram illustrating a $CO_2$ recovery device according to Embodiment 1.

As illustrated in FIG. 1, a $CO_2$ recovery device 10A according to the embodiment includes a $CO_2$ absorption tower (hereinafter, referred to as "absorption tower") 13 and an absorption-solution regeneration tower (hereinafter, referred to as "regeneration tower") 14. The $CO_2$ absorption tower 13 has the following: a $CO_2$ absorption section 13A in which $CO_2$-containing flue gas 11A is brought into contact with a $CO_2$ absorption solution 12, namely a basic-amine-compound absorption solution, so as to remove $CO_2$ from the $CO_2$-containing flue gas 11A; and a water-washing section 21 in which decarbonated flue gas 11B, from which $CO_2$ has been removed in the $CO_2$ absorption section 13A, is brought into contact with washing water 20 so as to remove accompanying substances accompanying the decarbonated flue gas 11B. The absorption-solution regeneration tower 14 regenerates the $CO_2$ absorption solution (rich solution 12A) that has absorbed $CO_2$. This $CO_2$ recovery device, in which a lean solution 12B from which $CO_2$ has been removed in the regeneration tower 14 is reused in the absorption tower 13, has an aldehyde-removing agent supply unit 23 that supplies an aldehyde removing agent 22, for example, at least one of a sulfite compound, a bisulfite compound, and a mixture thereof to a circulating washing-water line $L_1$ that circulates the washing water 20 to the water-washing section 21.

In the water-washing section 21, the washing water falls from a tower top portion through liquid distributor, the rising decarbonated flue gas 11B is brought into counterflow contact with the washing water 20 to be washed, and the washing water 20 is recovered in a liquid storage unit 24.

The recovered washing water 20 is reused by a circulating pump 25 which is provided in the circulating washing-water line $L_1$. In addition, the washing water 20 is cooled to a predetermined temperature by a cooling unit 26 which is provided in the circulating washing-water line $L_1$.

In the embodiment, a rich/lean solution heat exchanger 52 is provided to exchange heat between the rich solution 12A and the lean solution 12B from which $CO_2$ has been emitted.

In FIG. 1, reference numeral 13a represents a tower top portion, reference numeral 13b represents a tower bottom portion, reference numeral 19 represents a mist eliminator for capturing mist in a gas, reference numeral 51 represents a rich solution pump, reference numeral 54 represents a lean solution pump, reference numeral $L_{11}$ represents a rich solution supply pipe, and reference numeral $L_{12}$ represents a lean solution supply pipe.

In the absorption tower 13, the $CO_2$-containing flue gas 11A is brought into counterflow contact with the amine-based $CO_2$ absorption solution 12 containing, for example, alkanolamine as a base in the $CO_2$ absorption section 13A which is provided on a downstream side of the absorption tower 13, and the $CO_2$ absorption solution 12 absorbs $CO_2$ in the $CO_2$-containing flue gas 11A due to a chemical reaction ($R-NH_2+H_2O+CO_2 \rightarrow R-NH_3HCO_3$).

As a result, substantially almost no $CO_2$ remains in the decarbonated flue gas 11B which has passed through the $CO_2$ absorption section 13A and risen in the absorption tower 13.

Next, the $CO_2$-removed flue gas 11B rises toward the water-washing section 21 through a chimney tray 16 and is brought into gas-liquid contact with the washing water 20 supplied from the top portion of the water-washing section 21, and the $CO_2$ absorption solution 12 accompanying the decarbonated flue gas 11B is recovered by circulation washing.

In the water-washing section 21, the washing water 20, which has been stored in the liquid storage unit 24 of the chimney tray 16, is circulated in the circulating washing-water line $L_1$ and is circulated and washed.

The cooling unit 26 is provided in the circulating washing-water line $L_1$ such that the washing water is cooled to a predetermined temperature (for example, 40° C. or lower).

Here, in the embodiment, the aldehyde removing agent 22, for example, at least one of a sulfite compound, a bisulfite compound, and a mixture thereof is supplied to the circulating washing-water line $L_1$. Therefore, in the water-washing section 21, the decarbonated flue gas 11B is brought into contact with the washing water 20 containing a sulfite compound, a bisulfite compound, or a mixture thereof, and thus amine compounds and aldehyde compounds in the decarbonated flue gas 11B can be simultaneously recovered.

As a result, the concentration of accompanying substances in outlet gas 11C emitted from the tower top portion 13a of the absorption tower 13 can be reduced.

Examples of the sulfite compound which is the aldehyde removing agent 22 include sodium sulfite, ammonium sulfite, and potassium sulfite. Examples of the bisulfite compound include sodium bisulfite, ammonium bisulfite, and potassium bisulfite. However, the present invention is not limited to these examples, and any material may be used as long as it can decompose and remove aldehyde.

The rich solution 12A that has absorbed $CO_2$ in the absorption tower 13 is extracted from the tower bottom portion 13b, the pressure thereof is increased by the rich solution pump 51 provided in the rich solution supply pipe $L_{11}$, and the rich solution 12A is supplied to the top portion of the regeneration tower 14.

From the rich solution 12A which has been emitted into the inside of the regeneration tower 14 through the tower top portion, most of the $CO_2$ is emitted by heating the rich solution 12A by steam from the tower bottom portion. The $CO_2$ absorption solution 12 from which a part or most of the $CO_2$ has been emitted in the regeneration tower 14 is called "semi-lean solution". When the semi-lean solution (not illustrated) flows down to the bottom portion of the regeneration tower 14, substantially all of the $CO_2$ is removed from the semi-lean solution, thereby obtaining the lean solution 12B. This lean solution 12B is obtained by heating the rich solution by saturated steam 62 in a regenerative heater 61 provided in a circulating line $L_{20}$. The heated saturated steam 62 is steam condensate 63.

On the other hand, $CO_2$ gas 41 accompanying steam, which is stripped from the rich solution 12A and the semi-lean solution (not illustrated) in the tower, is emitted from a tower top portion 14a of the regeneration tower 14.

The $CO_2$ gas 41 accompanying steam is guided to a gas emission line $L_{21}$, steam is condensed by a cooling unit 42 provided in the gas emission line $L_{21}$, and condensate 44 is separated in a separation drum 43. Next, the $CO_2$ gas 45 is emitted from the separation drum 43 to the outside of the system and is subjected to post-processing such as separate compression recovery.

The condensate 44 separated in the separation drum is supplied to an upper portion of the regeneration tower 14 by a condensate circulating pump 46 provided in a condensate line $L_{22}$.

Although not illustrated, a part of the condensate 44 may be supplied to the circulating washing-water line $L_1$ to be used as the washing water 20 of the $CO_2$ absorption solution 12 accompanying the outlet gas 11C.

The regenerated $CO_2$ absorption tower (lean solution 12B) is sent to the absorption tower 13 through a lean solution supply pipe $L_{12}$ by a lean solution pump 54 and is reused as the $CO_2$ absorption solution 12. At this time, the lean solution 12B is cooled to a predetermined temperature by the cooling unit 55 and is supplied to the $CO_2$ absorption section 13A through liquid distributor 56.

Accordingly, the $CO_2$ absorption solution 12 forms a closed passage of circulating around the absorption tower 13 and the regeneration tower 14 and is reused in the $CO_2$ absorption section 13A of the absorption tower 13. Optionally, the $CO_2$ absorption solution 12 is supplied by a replenishment line (not illustrated). In addition, optionally, the $CO_2$ absorption solution 12 is regenerated by a reclaimer (not illustrated).

The $CO_2$-containing flue gas 11A to be supplied to the absorption tower 13 is cooled by cooling water 71 in a cooling tower 70, which is provided in a previous stage of the absorption tower 13, and then is guided into the absorption tower 13. A part of the cooling water 71 may be also supplied to the top portion of the water-washing section 21 as the washing water 20 of the absorption tower 13 to be used for washing the $CO_2$ absorption solution 12 accompanying the decarbonated flue gas 11B. In the drawing, reference numeral 72 represents a circulating pump, reference numeral 73 represents a cooler, and reference numeral $L_{30}$ represents a circulating line.

TEST EXAMPLE 1

Figure 5A:
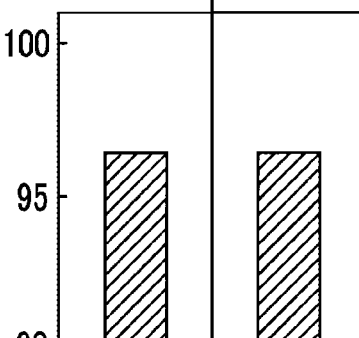
FIG. 5A is a diagram illustrating the results of a removal ratio (recovery ratio; %) of an amine compound in Test Example 1.
Figure 5B:
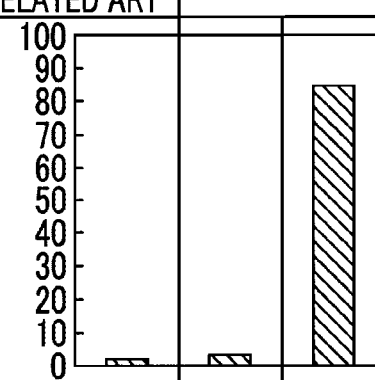
FIG. 5B is a diagram illustrating the results of a removal ratio (recovery ratio; %) of an aldehyde compound in Test Example 1.
Figure 6:
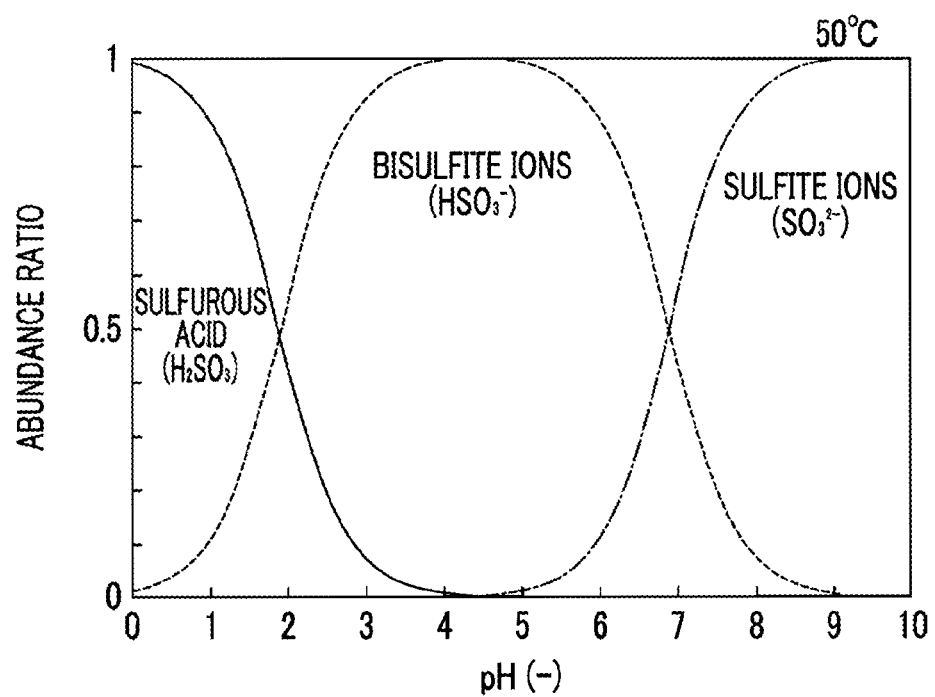
FIG. 6 is a diagram illustrating a state where the form of ions present in sulfurous acid changes depending on a change in pH

FIGS. 5A and 5B are diagrams illustrating the results of a removal ratio (recovery ratio; %) of an amine compound and the results of a removal ratio (recovery ratio; %) of an aldehyde compound in Test Example 1. FIG. 6 is a diagram illustrating a state where the form of ions present in sulfurous acid changes depending on a change in pH.

In this test example, sodium sulfite was used as the aldehyde removing agent (the same shall be applied to the following examples).

In FIGS. 5A and 5B, "Not Added" of the method of the related art denotes a case where a sulfite compound/bisulfite compound was not added to the washing water 20.

"Added" of Embodiment 1 denotes a case where a sulfite compound/bisulfite compound was added to the washing water 20.

During this addition, as illustrated in FIG. 5B, "Added (1)" denotes a case where sodium sulfite having a molar concentration of 1 M as the standard was added to the washing water 20.

During this addition, as illustrated in FIG. 5B, "Added (73)" denotes a case where sodium sulfite having a molar concentration of 73 M (73 times the standard) was added to the washing water 20.

As illustrated in FIG. 6, in sulfurous acid, the form of ions changes depending on the pH of a solution, the form including sulfurous acid ($H_2SO_3$), bisulfite ions ($HSO_3-$), and sulfite ions ($SO_3^{2-}$) in order from the lowest pH.

When the pH of the washing water was high (alkaline), sulfite ions were predominant. Therefore, the abundance of bisulfite ions contributing to reactive absorption of an aldehyde compound was low.

Accordingly, in the case of the standard molar concentration (left column) in FIG. 5B, the recovery ratio of an aldehyde compound was low. On the other hand, in the case of the molar concentration 73 times the standard (right column) in FIG. 5B, sulfurous acid having a molar concentration 73 times the standard was added to the washing solution. Therefore, even when the pH of the washing solution was high, a number of bisulfite ion were present, and thus aldehyde was able to be recovered.

Embodiment 2

Figure 2:
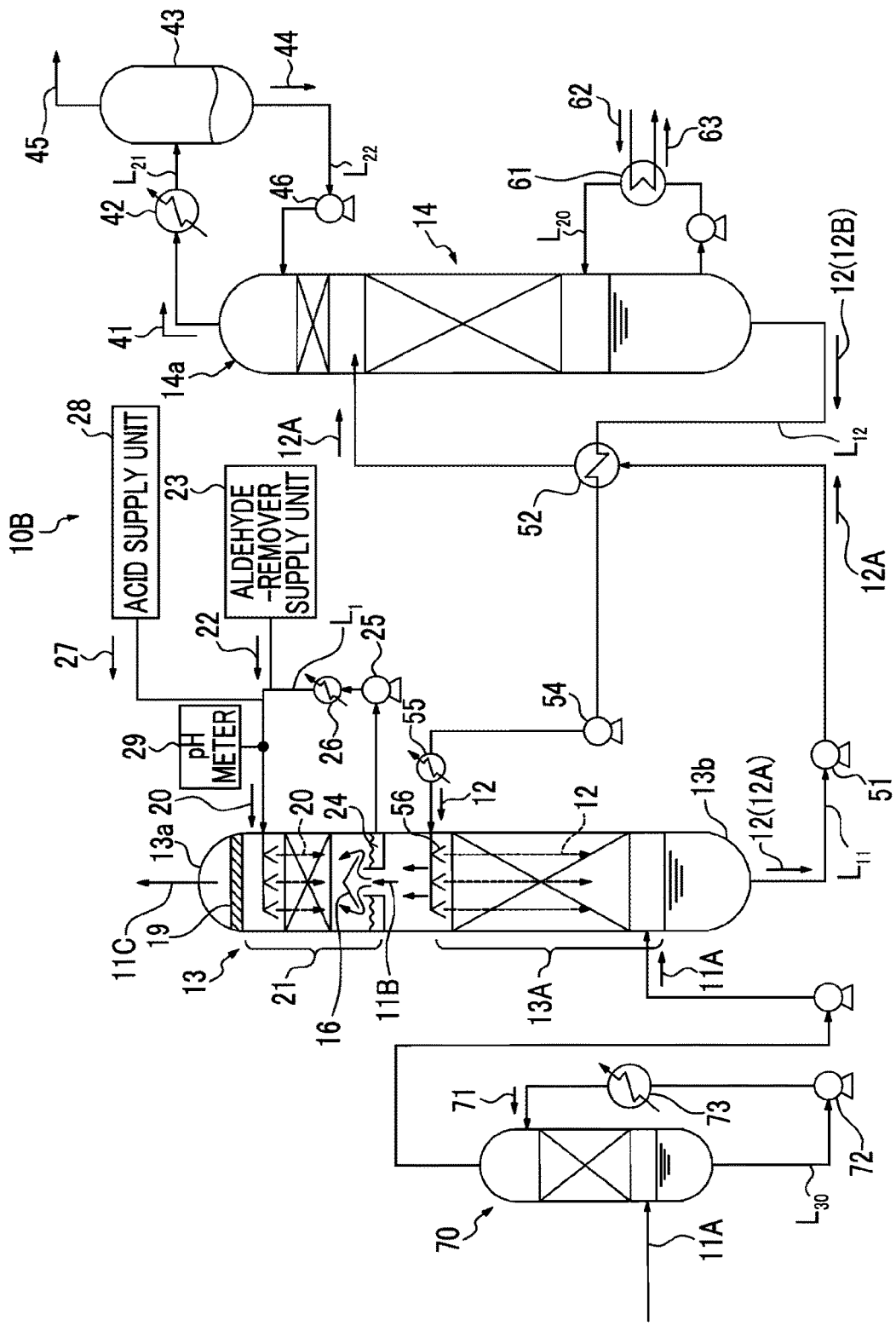
FIG. 2 is a schematic diagram illustrating a $CO_2$ recovery device according to Embodiment 2.

A $CO_2$ recovery device according to an embodiment of the present invention will be described with reference to the drawings. FIG. 2 is a schematic diagram illustrating a $CO_2$ recovery device according to Embodiment 2.

As illustrated in FIG. 2, a $CO_2$ recovery device 10B according to the embodiment is the same as the $CO_2$ recovery device 10A according to Embodiment 1 illustrated in FIG. 1, except that an acid supply unit 28 for supplying an acid 27 to the circulating washing-water line $L_1$ is provided, and the pH of the washing water 20 is controlled to be acidic. In the drawings, reference numeral 29 represents a pH meter for measuring pH.

By supplying, for example, dilute sulfuric acid as the acid 27, the washing water 20 of the water-washing section 21 is controlled to be acidic.

As described above using FIG. 6, when the pH of the washing water 2 is acidic, the amount of bisulfite ions is predominant. Therefore, a desired pH for recovering an aldehyde compound from the decarbonated flue gas 11B in the water-washing section 21 is obtained, and an aldehyde recovery efficiency is improved.

Accordingly, in the water-washing section 21, the concentration of accompanying substances in the outlet gas 11C emitted from the absorption tower 13 can be further reduced not only by bringing the decarbonated flue gas 11B into contact with the washing water 20 containing a sulfite compound, a bisulfite compound, or a mixture thereof and but also by controlling the pH of the washing water 20 of the water-washing section 21 to be in an appropriate range on the acidic side.

In the case of the standard addition amount "1" in Test Example 1 of Embodiment 1, an aldehyde compound was barely recovered. However, by the addition of the acid 27, a high recovery ratio can be achieved even in the case of the standard addition amount "1" of a sulfite/bisulfite compound.

TEST EXAMPLE 2

FIGS. 7A and 7B are diagrams illustrating the results of a removal ratio (recovery ratio; %) of an amine compound and the results of a removal ratio (recovery ratio; %) of an aldehyde compound in Test Example 2.

In FIGS. 7A and 7B, "Not Added" of the method of the related art denotes a case where a sulfite compound/bisulfite compound was not added to the washing water 20.

"Added" of Embodiment 2 denotes a case where a sulfite compound/bisulfite compound was added to the washing water 20. At this time, the standard pH was set such that the concentration ratio of bisulfite ions was high by adding dilute sulfuric acid.

During this addition, as illustrated in FIG. 7B, "Added (1)" denotes a case where sodium sulfite having a molar concentration of 1 M as the standard was added to the washing water 20. In this case, the recovery ratio of an aldehyde compound was improved as compared to the case of Test Example 1.

Accordingly, it was confirmed that, by adding the acid 27 to control the pH of the washing water to be in an appropriate range where the ratio of bisulfite ions is high, the aldehyde compound can be efficiently removed even if a small amount of sulfite compound is added.

Figure 8:
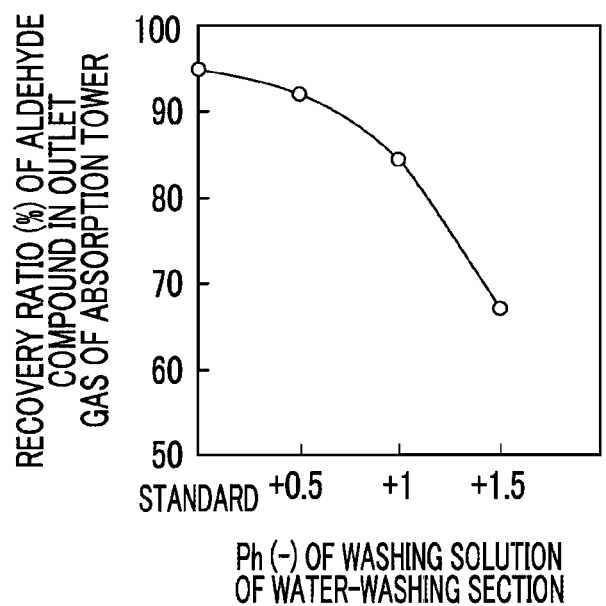
FIG. 8 is a diagram illustrating a relationship between the pH of washing water of a water-washing section and the recovery ratio of an aldehyde compound.

FIG. 8 is a diagram illustrating a relationship between the pH of the washing water of the water-washing section and the recovery ratio of an aldehyde compound.

As illustrated in FIG. 8, it was confirmed that, when the pH increases to be higher than the standard pH (the concentration ratio of bisulfite ions is high), the concentration of bisulfite ions decreases, and thus the recovery efficiency of an aldehyde compound decreases.

Embodiment 3

Figure 3:
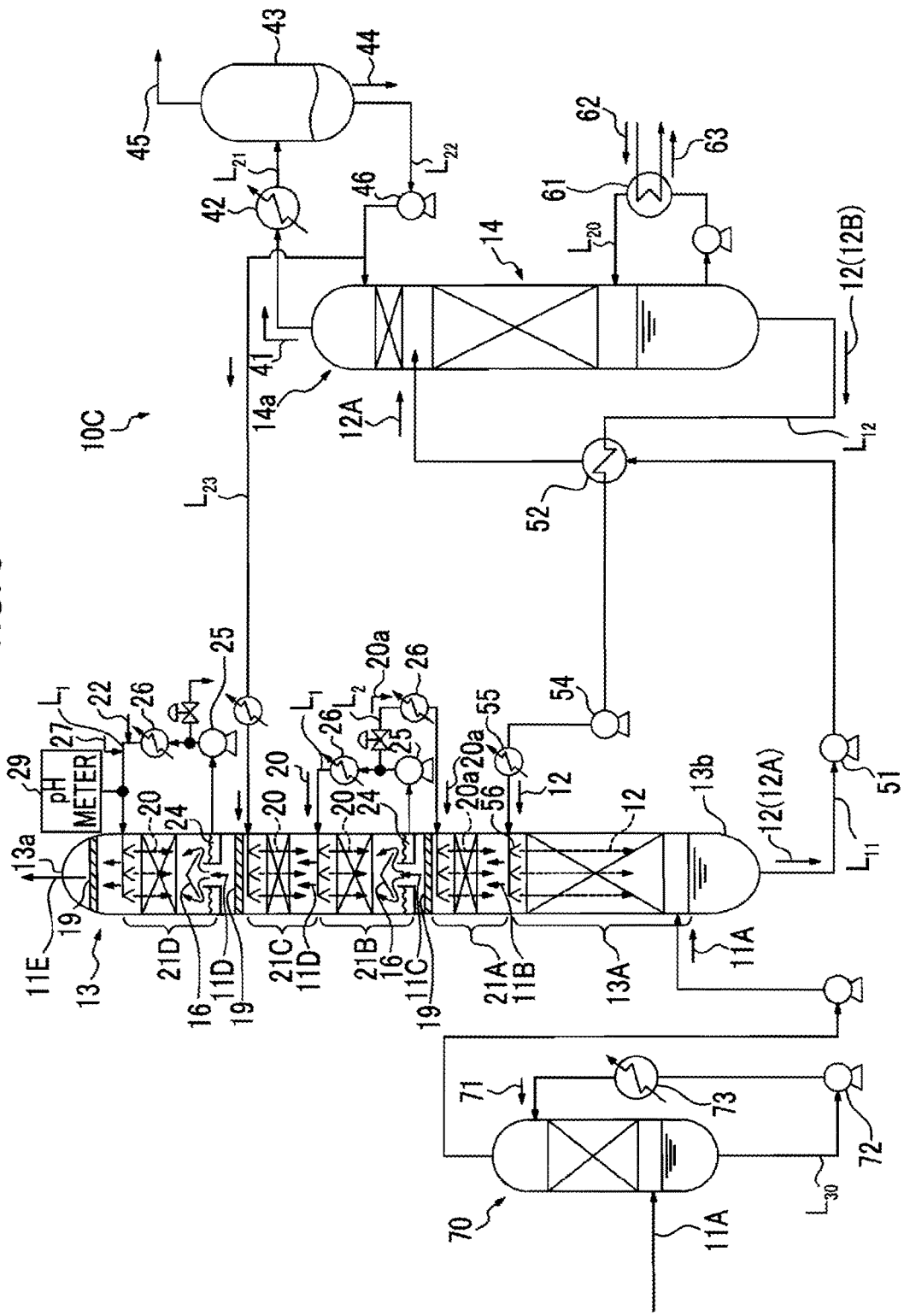
FIG. 3 is a schematic diagram illustrating a $CO_2$ recovery device according to Embodiment 3.

A $CO_2$ recovery device according to an embodiment of the present invention will be described with reference to the drawings. FIG. 3 is a schematic diagram illustrating a $CO_2$ recovery device according to Embodiment 3.

As illustrated in FIG. 3, a $CO_2$ recovery device 10C according to the embodiment is the same as the $CO_2$ recovery device 10B according to Embodiment 2 illustrated in FIG. 2, except that plural stages of water-washing sections are provided above the $CO_2$ absorption section 13A installed in the absorption tower 13.

Specifically, in order from the $CO_2$ absorption section 13A to the tower top portion 13*a*, a preliminary water-washing section 21A, a first water-washing section 21B, a second water-washing section 21C, and a third water-washing section 21D are provided.

The third water-washing section 21D functions as finish water-washing means for supplying the aldehyde removing agent 22 and the acid 27, which are described above in Embodiment 2, to the circulating washing-water line $L_1$ and recovering an aldehyde compound.

In addition, a mist eliminator 19 is provided at an outlet of the third water-washing section 21D, between the third water-washing section 21D and the second water-washing section 21C, and between the first water-washing section 21B and the preliminary water-washing section 21A so as to remove mist.

In addition, in the embodiment, as the washing water 20 to be introduced into the second water-washing section 21C, the condensate 44 separated from the separation drum 43 is used, and this condensate 44 is supplied through a washing water line $L_{23}$ branched from the condensate line $L_{22}$.

This supplied washing water 20 falls below the second water-washing section 21C and the first water-washing section 21B and is recovered in the liquid storage unit 24 on the bottom side of the first water-washing section 21B.

The washing water 20 recovered in the liquid storage unit 24 falls down from the top portion of the first water-washing section 21B through the circulating washing-water line $L_1$ and washes the decarbonated flue gas.

A portion 20a of the washing water 20 is supplied to the preliminary water-washing section 21A through a branch line $L_2$ branched from the circulating washing-water line $L_1$ to preliminarily wash the decarbonated flue gas 11B. After the preliminary water-washing, the washing water 20 falls below the $CO_2$ absorption section 13A, is regenerated along with the rich solution 12A in the regeneration tower 14, is recovered as the condensate 44, and is supplied again to the second water-washing section 21C through the washing water line $L_{23}$ branched from the condensate line $L_{22}$. In this way, the washing water can be reused in the closed system.

When the washing water 20 is insufficient, washing water may be separately supplied to the washing water line $L_{23}$ from the outside of the system.

Decarbonated flue gases 11B, 11C, and 11D pass through the preliminary water-washing section 21A and the first water-washing section 21B to the third water-washing section 21D and are emitted to the outside through the tower top portion 13a as outlet gas 11E.

While the basic amine compound accompanying the decarbonated flue gas is removed in the preliminary water-washing section 21A, the first water-washing section 21B, and the second water-washing section 21C, the aldehyde compound accompanying the decarbonated flue gas is removed in the third water-washing section 21D at the same time. Therefore, emission of volatile organic compounds from the absorption tower 13 to the outside of the system is significantly suppressed.

In addition to the effects of Embodiment 2, the concentration of accompanying substances diffused in the outlet gas 11E of the absorption tower 13 can be significantly reduced by providing the plural stages of water-washing sections (in the embodiment, two stages: the first and second water-washing sections/the third water-washing section; four layers: 21A to 21D).

TEST EXAMPLE 3

FIGS. 9A and 9B are diagrams illustrating the results of a removal ratio (recovery ratio; %) of an amine compound and the results of a removal ratio (recovery ratio; %) of an aldehyde compound in Test Example 3.

The number of stages of water-washing section was two (four layers).

In FIGS. 9A and 9B, "Not Added" of the method of the related art denotes a case where a sulfite compound/bisulfite compound was not added to the washing water 20.

"Added" of Embodiment 3 denotes a case where a sulfite compound/bisulfite compound was added to the washing water 20. At this time, the standard pH was set such that the concentration ratio of bisulfite ions was high by adding dilute sulfuric acid.

During this addition, as illustrated in FIG. 9B, "Added (0.75)" denotes a case where sodium sulfite having a molar concentration 0.75 times 1 M was added to the washing water 20 having the standard amount of "1" of Test Example 1. In this case, the recovery ratio of an aldehyde compound was improved as compared to the case of Test Example 2.

Accordingly, it was confirmed that, by providing plural stages of water-washing sections and adding the acid 27 to control the pH of the washing water to be in an appropriate range where the ratio of bisulfite ions is high, aldehyde compounds can be efficiently removed even if a small amount of sulfite compound is added.

Embodiment 4

Figure 4:
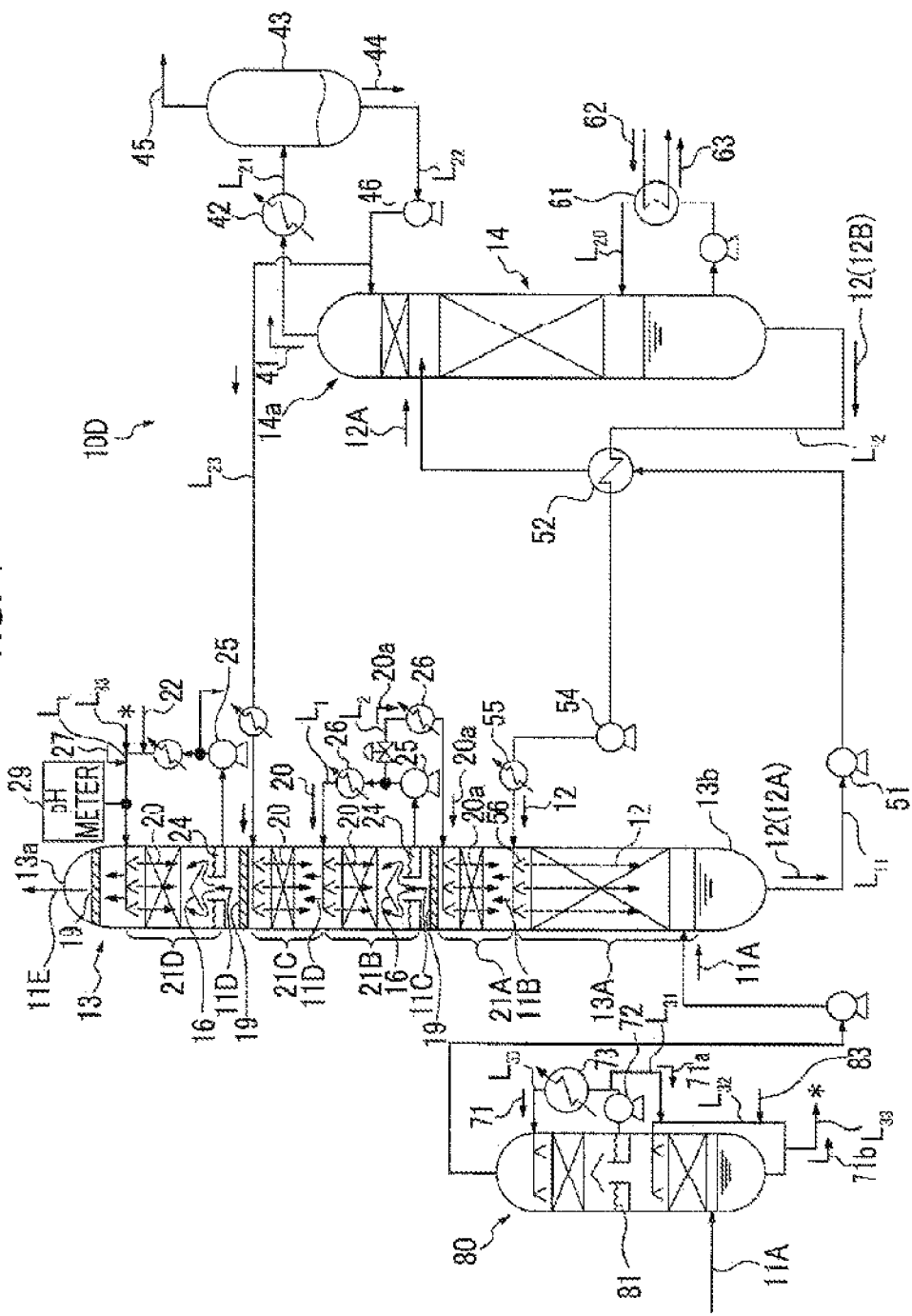
FIG. 4 is a schematic diagram illustrating a $CO_2$ recovery device according to Embodiment 4.

A $CO_2$ recovery device according to an embodiment of the present invention will be described with reference to the drawings. FIG. 4 is a schematic diagram illustrating a $CO_2$ recovery device according to Embodiment 4.

As illustrated in FIG. 4, a $CO_2$ recovery device 10D according to the embodiment is the same as the $CO_2$ recovery device 10C according to Embodiment 3 illustrated in FIG. 3, except that a cooling tower 80 for recovering $SO_2$ from flue gas is provided as cooling means for cooling the $CO_2$-containing flue gas 11A, the cooling means being provided in a previous stage of the absorption tower 13.

The cooling tower 80 according to the embodiment is provided with a liquid storage unit 81 for recovering cooling water 71 in the tower, and the inside thereof has a two-stage configuration.

In an upper stage, similar to the cooling tower 70, the $CO_2$-containing flue gas 11A is cooled by the cooling water 71 which circulates around a circulating line $L_{30}$. A portion 71a of the cooling water 71 is supplied to a circulating line $L_{32}$ which circulates on a lower stage through a liquid feed line $L_{31}$. For example, sodium hydroxide 83 is supplied to the circulating line $L_{32}$ as an alkali agent to remove $SO_2$ present in the $CO_2$-containing flue gas 11A and to introduce a sulfite compound into the cooling water 71a.

A portion is separated from the cooling water 71b containing the sulfite compound and is introduced through a supply line $L_{33}$ to the circulating washing-water line $L_1$ into which the aldehyde removing agent 22 is introduced from the aldehyde-removing agent supply unit (in FIG. 4, symbol "*").

As a result, by introducing the cooling water 71b containing the sulfite compound to the third water-washing section 21D, the addition amount of the aldehyde removing agent 22 which is separately supplied from the outside can be reduced.

Figure 10:
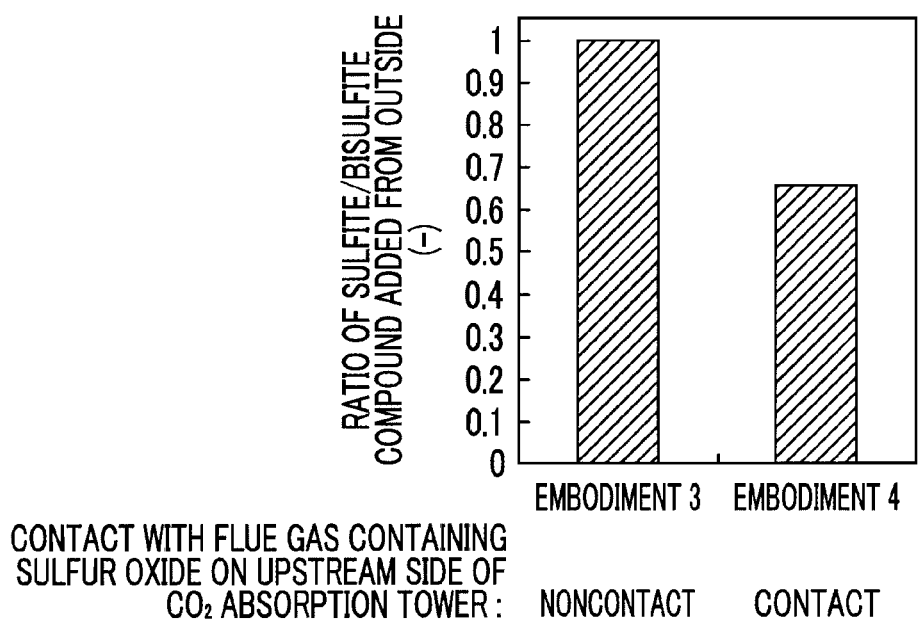
FIG. 10 is a diagram illustrating a reduction ratio of the amount of a sulfite compound added.

FIG. 10 is a diagram illustrating a reduction ratio of the amount of a sulfite compound added.

As illustrated in FIG. 10, in the case of the addition amount of "1" in Embodiment 3, when a portion of the cooling water from which sulfur oxides in flue gas have been recovered in the cooling tower 80 is used as the aldehyde removing agent, an addition amount ratio is lower than 0.65, and about 30% or higher of the cost for chemicals can be saved.

REFERENCE SIGNS LIST 10A to 10D: $CO_2$ RECOVERY DEVICE
11A: $CO_2$-CONTAINING FLUE GAS

11B: DECARBONATED FLUE GAS
12: $CO_2$ ABSORPTION SOLUTION
13: $CO_2$ ABSORPTION TOWER
13A: $CO_2$ ABSORPTION SECTION
20: WASHING WATER
21: WATER-WASHING SECTION
21A: PRELIMINARY WATER-WASHING SECTION
21B: FIRST WATER-WASHING SECTION
21C: SECOND WATER-WASHING SECTION
21D: THIRD WATER-WASHING SECTION
22: ALDEHYDE REMOVING AGENT
23: ALDEHYDE-REMOVING AGENT SUPPLY UNIT
27: ACID
28: ACID SUPPLY UNIT

The invention claimed is:

1. A $CO_2$ recovery method in which a $CO_2$ absorption tower and an absorption-solution regeneration tower are used to reuse a lean solution, from which $CO_2$ has been removed in the absorption-solution regeneration tower, in the $CO_2$ absorption tower, the $CO_2$ absorption tower bringing $CO_2$-containing flue gas into contact with a basic amine compound so as to remove $CO_2$, the absorption-solution regeneration tower separating $CO_2$ from the $CO_2$-absorbed basic amine compound to regenerate a $CO_2$ absorption solution, and the method comprising:

supplying an aldehyde-compound removing agent to washing water while washing decarbonated flue gas with the washing water in a water-washing section to simultaneously remove basic amine compounds and aldehyde compounds; and supplying an acid to the washing water to control pH thereof to be on an acidic side;

wherein, on an upstream side of the $CO_2$ absorption tower, flue gas containing $CO_2$, a nitrogen oxide, and a sulfur oxide is brought into contact with alkali-added cooling water to cool the flue gas, and, after the contact, the alkali-added cooling water is used as circulating water of the water-washing section.

2. The $CO_2$ recovery method according to claim 1, wherein plural stages of water-washing sections are provided, and the aldehyde-compound removing agent is supplied to a top water-washing section of the $CO_2$ absorption tower.

* * * * *